UNITED STATES PATENT OFFICE.

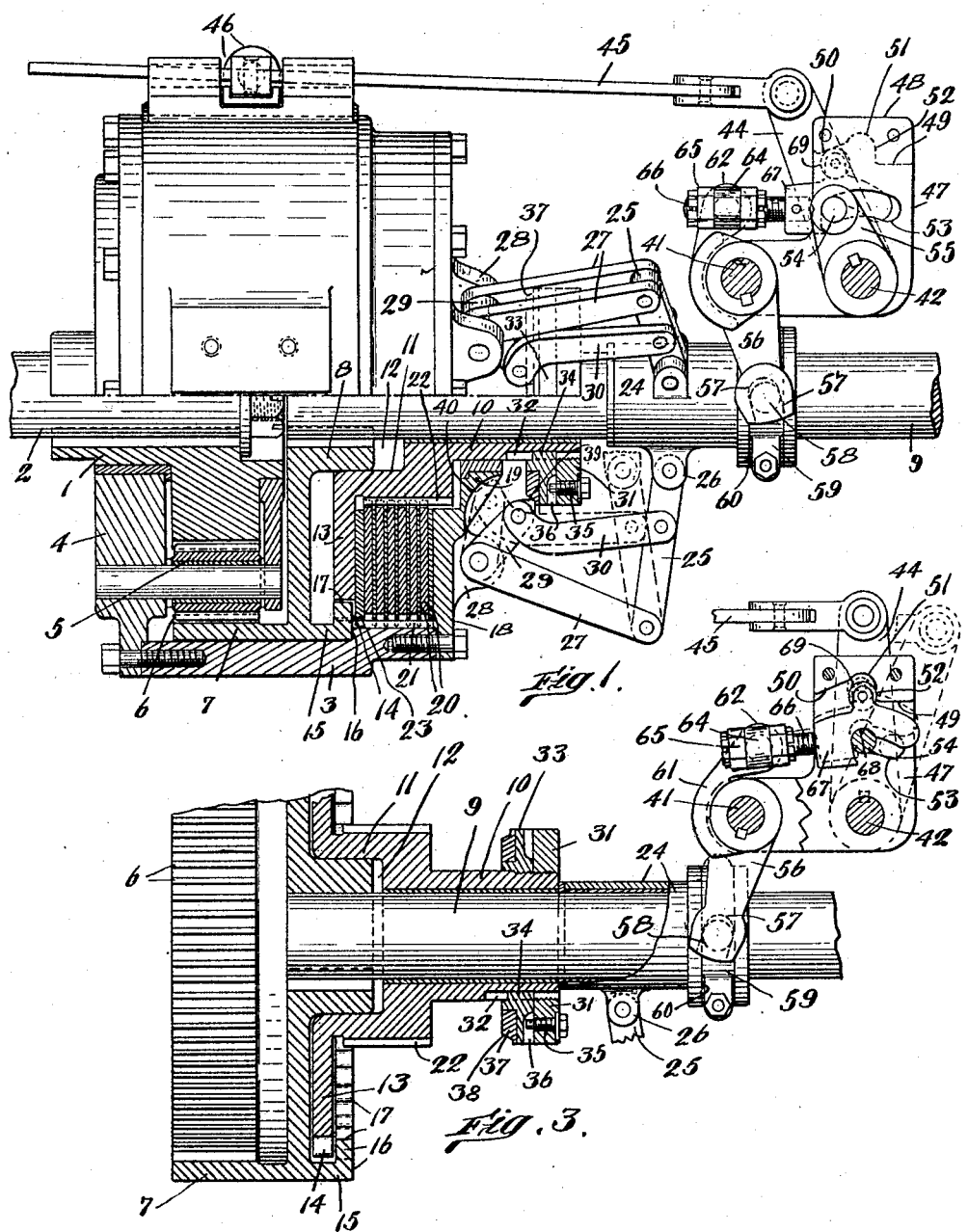

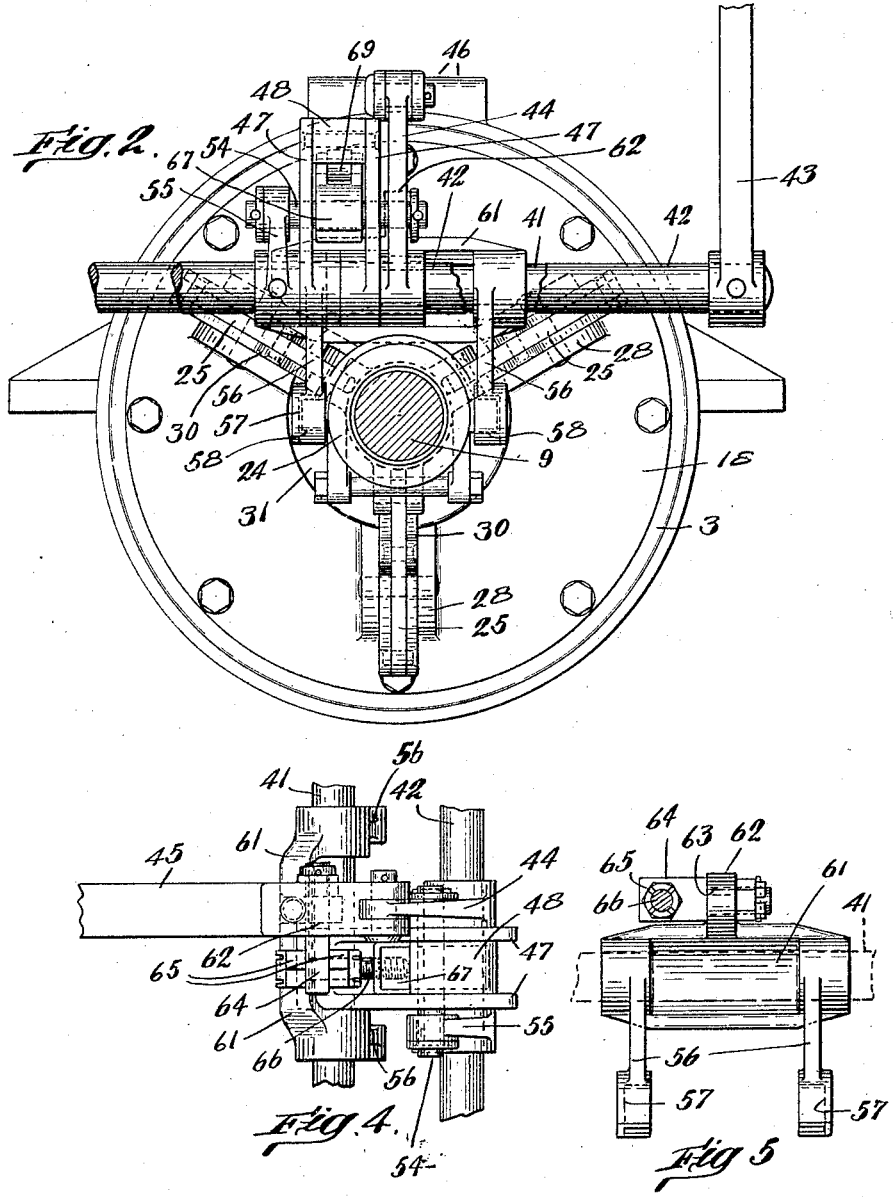

HENRY A. TUTTLE, OF TAUNTON, MASSACHUSETTS.

REVERSING-GEARING.

1,392,983.     Specification of Letters Patent.     Patented Oct. 11, 1921.

Application filed June 25, 1917. Serial No. 176,673.

*To all whom it may concern:*

Be it known that I, HENRY A. TUTTLE, a citizen of the United States, residing at Taunton, in the county of Bristol and State of Massachusetts, have invented an Improvement in Reversing-Gearing, of which the following is a specification.

This invention relates to an improvement in reversing gearing of the type wherein independent shafts, as a driving shaft and a driven shaft, may, through such gearing, be forwardly or reversely rotated, or one, as the driven shaft, remain without rotation, while the other is rotating; the particular reversing gearing of the type which the present invention is designed to improve, generally including a spur gear secured to a driving shaft and engaging pinions mounted in a pinion carrier or case, the rotation of which is controlled by a brake, an internal gear having fixed connection with the driven shaft and meshing with the pinions, and a manually controlled clutch mechanism, including a series of clutch plates, being arranged to connect the pinion carrier or case, and the internal gear, at will.

In this type of reverse gearing, when the clutch is operated to dispose its plates in clutched relation, the driving action is through the clutch plates; while in position of the parts for reverse drive, the plates are spaced, that is, free of pressure contact, and the case or pinion carrier is held against rotative movement by the brake and the drive is through the pinions and internal gear. In this particular construction, as heretofore proposed, in the reverse drive position of the parts, one set of clutch plates is positively held by the pinion case or carrier, as the case is held stationary by the brake, and the other set of plates is rotated with and by the internal gear secured to the driven shaft. The adjacent clutch plates have, therefore, in effect relatively opposite rotation or more exactly one rotates, while the other is held stationary, and, as there is, in practice, a necessarily slight contact between the plates and a consequent appreciable degree of friction or drag, due to the quantity of oil or grease necessary to be used, there develops an internal absorption of power which prevents the delivery of the proper proportional power to the driven shaft in the reverse drive action of the clutch.

One of the objects of my invention is to obviate the absorption of power by the clutch mechanism in the neutral and reversing operative conditions of the reverse gearing, and I accomplish this result in the provision of means whereby one set of clutch plates may be operatively disconnected from its driving member in the neutral and reverse conditions of the gearing to thereby permit said clutch mechanism to revolve as a unit, or to be without motion in certain operative conditions of the gearing and thereby to prevent the consequent power absorption due to liquid friction, that is always present when the two sets of clutch plates are constrained to revolve in relatively opposite direction.

The construction involved in this detail of the improvement comprises a disk carrier having a gear or toothed coöperation with the internal gear when in forward drive, and being wholly free of any connection with the internal gear when in neutral and in reverse drive positions, the disk carrier serving as a means for connection for the alternate clutch plates of the clutch, the remaining clutch plates of which are connected to the pinion case or carrier as in the usual structure.

As a result of this improvement, it is necessary to provide a structure whereby the clutch plate carrier may be positively operated only in moving from neutral to forward drive position and from forward drive position to neutral, the neutral position of the plate carrier being maintained when the parts of the clutch are in reverse drive positions, and this structure comprises means whereby the thrust sleeve, operated as heretofore through the usual lever, is directly actuated in such movements of the lever as will tend to either a forward drive or neutral position, and by which the parts of the clutch operating means is automatically freed from connection with the thrust sleeve in the movement of such operating means to set the brake for reverse drive.

In some types of reversing gearing as heretofore constructed, there is provided a clutch plate carrier which has fixed connection with the internal gear, so far as relative rotation is concerned, but which is axially movable to permit clutching action, the said carrier forming one element in which certain of the clutch plates are operatively connected, and the case forming the other element in which the other clutch plates are operatively connected. In this construction the carrier is held against independent rotation with respect to the internal gear with the effect that the friction or viscosity of the lubricant between the plates, when said plates are in unclutched relation, tends to create a movement in the driven shaft in the neutral condition of the reverse gearing, and to absorb power when the gearing is operated with the parts in position for reverse drive.

The present invention aims to avoid these objections by providing a free plate carrier which has fixed rotative connection with the internal gear only in forward drive positions of the parts, the plate carrier in neutral and in reverse drive positions of the parts being wholly free of connection with the internal gear. Under these circumstances, the entire clutch mechanism is motionless while the gearing is operating for reverse drive and consequently there is no power absorbed by the clutch members, as heretofore, and with the clutch in the neutral position, the drag or friction between the plates may operate to cause the rotation of the entire clutch as a unit, but is without effect to rotate the driven shaft, and the power absorbed is negligible. Therefore, the present type of mechanism in this particular improvement, provides for the delivery of the maximum power in reverse drive, thereby materially increasing the utility of the structure in this particular.

Certain features of this invention are described in my co-pending applications Serial Nos. 175,268, filed June 18, 1917; 274,247, Jan. 31, 1919; 339,108, Nov. 19, 1919; 344,532, Dec. 13, 1919.

In the drawings,

Figure 1 is a view in side elevation, partly in section, illustrating the improved reverse gearing.

Fig. 2 is a front elevation of the same.

Fig. 3 is a sectional view partly in elevation illustrating more particularly the respective positions of the actuating-means.

Fig. 4 is a plan view of the automatic control for the actuating-means.

Fig. 5 is a front elevation of the automatic control for the actuating-means.

In the specific details illustrated, the reversing gearing includes a spur gear 1, adapted for fixed connection with a driving shaft 2, such as an engine shaft. Surrounding the spur gear and extending in one direction beyond the same is the pinion carrier or case 3, having a removable end wall 4 immediately adjacent the spur gear. Pinions 5 are supported by pins in the end wall 4 and are maintained in mesh with the spur gear and with the teeth 6 of an internal gear 7, rotatably mounted within the case and having a hub portion 8 which is keyed or otherwise secured to a driven shaft 9, such as a propeller shaft.

The detail construction of the particular feature of my invention whereby certain of the clutch plates may be operatively disconnected from the driven element, as for instance, the internal gear which is connected with the driven shaft upon certain operative conditions of the reverse gearing, as here shown, comprises a clutch plate carrier in the form of a hub 10 arranged to loosely encircle the driven shaft beyond the hub on the internal gear. Forward of the hub, the carrier is formed with an enlarged annular portion 11 having an internal diameter sufficiently exceeding the diameter of the hub to provide a space 12 between the driven shaft and annular portion 11, to receive the hub 8 of the internal gear. A radical flange or wall 13 extends outwardly from the free extremity of the annular portion 11 of the carrier, and has a maximum diameter somewhat less than that of the case 3 at this point, said flange or wall 13 forming one wall of the clutch plate chamber. The peripheral edge of the wall 13 is formed with a series of teeth 14, and the annular wall of the gear 7 is formed concentric with the hub and is provided with an extension 15 having an inturned marginal wall 16 on which is formed a series of teeth 17. The wall 13 of the plate carrier, which wall will be hereinafter termed a gear wall, and the wall 16 of the internal gear, which wall will be hereinafter termed a gear wall, are designed to be in mesh when the parts of the clutch are in forward drive position, as will later appear, and, under which circumstances, there is an appreciable space provided between the gear wall of the plate carrier and the adjacent wall of the internal gear, the coöperative arrangement of the parts of the internal gear and plate carrier permitting a relatively longitudinal movement, that is, a movement of the plate carrier to a position where the teeth of its gear wall will be free of connection with the teeth of the gear wall of the internal gear.

The case 3 extends beyond the plane of the gear wall of the internal gear, and to its free edge is secured a plate 18 which forms the end wall of said case in opposition to the end wall 4, the wall 18 of the case being offset to provide a shoulder or boss 19, which latter, through suitable antifrictional material, rotatably bears upon the hub 10 of the plate carrier. The plate carrier and the case 3 constitute the respective connections for the clutch plates 20, certain of which are adapted for sliding engagement with teeth 21 on the case, the remaining and alternate clutch plates having similar engagement with teeth 22 on the plate carrier. The alternate clutch plates are thus operatively connected to the plate carrier and to the case, and in the detail structure illustrated, it is obvious that the necessity for clearance in forming the elongated tooth 22 of the plate carrier necessitates the use of a clutch plate of unusual thickness between the inner wall of such carrier and the adjacent clutch plates, the clutch plate being connected at 23 and having interlocking coöperation with the case.

Slidably and rotatably mounted upon the driven shaft is a thrust sleeve 24, which forms part of an actuating mechanism by which the various clutch parts may be set as desired. In the structure shown, the mechanism intermediate the sleeve and plate carrier, which is herein adapted to be operated in the clutching and unclutching action of the plates includes links 25 pivotally connected to ears 26 projecting radially from the sleeve, the outer ends of which links are connected through links 27 to ears 28 which project from the wall 18 of the case. Mounted on the pivot connecting the links 27 and the ears 28 are fingers 29, pivotally connected, intermediate their length, to operating links 30, which are in turn connected with the aforesaid links 25. The hub 10 of the plate carrier extends through the shoulder 19 of the case 3 and the end of said hub is exteriorly threaded to receive an adjusting collar 31. The extension of the hub 10 is formed with a keyway 32 and a ring 33 encircles the hub, having a key extension 34 seated in the keyway. Said collar 31 and ring 33 are adapted to be secured in fixed relation or permitted independent movement at will, the connection securing said collar and ring in fixed relation including a pin 35 threaded through the collar and seated in any one of a series of openings 36 in the ring. The ring 33, on its inner surface, or that surface next the clutch case, is cut away to receive an annular member 37, which latter is held in any appropriate manner for free rotative movement with respect to the ring. One edge of the said member is beveled, as at 38, to receive suitably-formed terminals or toes 39 of the fingers 29.

It is obvious that the actuating-mechanism will necessarily compel axial movement of the plate carrier in the operation of the parts, the movement in one direction, that is, in the direction to dispose the parts for forward drive action, being secured by a shifting of the thrust sleeve to cause the free ends of the fingers 29 to move upwardly and through their engagement with the member 37 to move the plate carrier, so that the teeth of its gear wall 13 are in mesh with the teeth of the gear wall of the internal gear thus connecting the clutch mechanism with a driven element and the said wall 13 of the plate carrier acting simultaneously to force the clutch plates into clutching coöperation so that the plate carrier serves as the actuating member for the clutch. This movement is from the position shown in Fig. 3 to the position shown in Fig. 1. A further movement of the sleeve in a proper direction, that is, toward the left, from that indicated in Fig. 1 of the drawing, will cause the end of the sleeve to engage the end of the hub 10 of the plate carrier or actuating member, with the effect to move the same in a direction to disengage the teeth of the respective gear walls of the plate carrier and internal gear, and at the same time, free the clutch plates from their clutching coöperation. This final position is shown in Fig. 3, and is the neutral position. This movement of the thrust sleeve carries the fingers 29 toward the case, and by preference, the shoulder or boss 19 of the case is recessed at 40 to partly house the fingers, to avoid their undue projection.

When in neutral position, which is illustrated more particularly in Fig. 3 of the drawings, it is to be noted that the thrust sleeve is against the hub of the plate carrier, and that the gear wall of the latter has been moved over into proximity to the adjacent wall of the internal gear, thus disengaging the teeth 14 and 17. From the result desired, previously set forth, it is apparent that the further operation of the actuating-mechanism to position the parts for reverse drive must be without effect upon the thrust sleeve, and to secure the advantages noted, the parts, particularly the plate carrier or clutch actuating member, must remain in its neutral position, that is, where it is wholly free of connection with any other part of the structure except the clutch plates which it carries. To provide an actuating mechanism which will permit this result and be wholly and completely automatic in its operation, forms an important feature of the present invention and involves the employment of operating mechanism for said actuating mechanism having certain characteristics, as will be described. Such mechanism is shown particularly in the drawings in the above positions of the parts.

In the present preferred details of the operating mechanism, there is mounted above the thrust collar, what may be termed a forward shaft 41, and a rear shaft 42, each of the shafts being supported in suitable fixed bearings not necessarily illustrated. On the rear shaft, at any appropriate point, is fixed the operating lever or handle 43, while at a point approximately above the thrust sleeve, the rear shaft has secured thereon, an arm 44 connected at the upper end by a rod 45 to govern the braking mechanism 46 which may be of any suitable type, and which is adapted, when in set relation, to secure the case 3 against rotative action, as is usual in this type of reversing gearing.

A locking guide 47 is supported upon the shafts 41 and 42, being preferably in the form of spaced plate sections approximately of right angular form, the horizontal portion affording bearing for the respective shafts, and the vertical portion extending above the rear shaft with the upper ends of the plates forming the vertical portions of the guide connected by a spacing block 48 having a cam face 49 on the lower surface. The cam face presents from the forward edge an upwardly, rearwardly inclined part 50 and a rounded part 51 into which the inclined face merges, the cam face beyond said rounded part 51 presenting a relatively deep shoulder 52. The vertical portions of said plates are further formed with an arcuate slot 53 and slidably mounted in the slot is a guide shaft 54, the terminals of which beyond the guide are mounted in the arm 44 on one side of the guide and in a supporting arm 55 secured to the rear shaft on the opposite side of the guide, the latter arm serving merely to support the guide shaft beyond the guide. The forward shaft 41 is provided with depending arms 56 arranged in spaced relation and having terminal recesses 57 loosely engaging pins 58 disposed in diametrically opposed relation on a collar 59 mounted for free rotative movement in a channel or way 60 formed at one terminal of the thrust sleeve, which construction provides for moving the sleeve longitudinally of the driven shaft independently of the rotative action of said sleeve. Above the shaft 41, the arms 56 are connected by a bridge 61 from which rises a lug 62. Said lug is formed with a transversal opening 63 to receive a removable holding block 64. The block 64 is formed with a transverse opening in which a bolt 66 is adjustably secured through the medium of nuts 65. Said bolt extends rearwardly, and is secured into and carries a trip 67 which operates between the plates of the guide, and has formed on its lower surface a rounded recess 68 to receive the shaft 54 carried by the arm 44. The upper edge of the trip is provided with an extension carrying a roller 69 which is adapted to bear against the cam face of the block 48.

From the specific construction, with relation to the actuating mechanism, it is apparent that the operative connection between the arm 44, which is the main arm, and the shaft 41, which is the shaft from which the thrust sleeve is directly actuated, is through the trip 67. It will be noted that the cam face of the block is so disposed that when the thrust sleeve is in position to secure the parts of the reversing gearing for forward driving, the roller 69 is bearing beneath the inclined face 50 of the cam surface, thus maintaining a fixed coöperation between the trip and shaft 54, so that the movement of the arm 44 is of necessity transmitted to the thrust sleeve.

As the movement of the arm continues, that is, toward the right in the illustration, it will be apparent that the roller 69 of the trip will ride up the incline of the cam face, and finally, when the parts of the actuating mechanism have reached the positions necessary to set parts of the reversing gearing in neutral position, the roller 69 will be in the recess 51 of the cam face. The trip is now free to permit a slight upward movement thereof which movement is sufficient to disengage the shaft 54 of the arms 44 from the recess 68 in the trip. A further movement of the shaft resulting from a movement of the arm 44 into that position which will set the brake and thereby arrange the parts of the structure for reverse drive will displace the trip, as it is not held against upward movement, and is limited in further movement in the same direction by the shoulder 57. The arm will, therefore, move to the further limit to the slot 53, free of the trip, to set the mechanism for reverse drive, but without moving the clutch members. Therefore, from the neutral position of the thrust sleeve, the further movement of the necessary parts of the actuating mechanism to set the brakes for reverse drive is without effect upon the thrust sleeve; or in other words, the plate carrier, having been moved to a disengaged position for neutral, is left in such position for reverse drive, and, therefore, the entire clutch mechanism is at rest and there can be no absorption of power therein. Any tendency to drag between the clutch plates when in neutral relation will simply act against an idle member, the plate carrier, and will absorb but a negligible amount of power, and hence the driven shaft may remain at rest when the parts are in neutral, and, of much more importance, the said driven shaft may receive a due proportion of power for reverse drive action, that power heretofore utilized to overcome the drag being now free for direct reverse influence on the driven shaft. It will be noted that the term actuating means herein employed as applied to the structure includes both the actuating mechanism and the operating mechanism which is connected with the reverse drive mechanism, thus broadly including means for connecting the clutch mechanism with a driven element and for operating the clutch to connect the driving and driven shafts and for operating the reverse drive mechanism.

It will be understood that herein the terms gears, gearing, and the expression "gearing adapted to connect the shafts for reverse drive," are names given to elements and groups of elements without regard to their structure. Structurally speaking they may or may not involve what are known specifically as gears.

I claim:—

1. In a reversing gearing, a driving-shaft, a driven-shaft, gearing adapted to connect said shafts for reverse drive, clutch-mechanism adapted to connect said shafts for forward drive, said clutch-mechanism adapted to be disengaged from the driven element in reverse drive position, whereby it will remain stationary.

2. In a reversing gearing, a driving-shaft, a driven-shaft, gearing adapted to connect said shafts for reverse drive, clutch-mechanism adapted to connect said shafts for forward drive, said clutch-mechanism adapted to be disengaged from the driven element in neutral and reverse drive positions.

3. In a reversing gearing, a driving-shaft, a driven-shaft, gearing adapted to connect said shafts for reverse drive, clutch-mechanism adapted to connect said shafts for forward drive, said clutch-mechanism adapted to be disengaged from the driven element in neutral position.

4. In a reversing gearing, a driving-shaft, a driven-shaft, gearing adapted to operably connect said shafts for reverse drive, clutch-mechanism adapted to operably connect said shafts for forward drive, said clutch-mechanism having means which admits of its operative disconnection from the driven shaft of the reverse drive gearing in reverse drive.

5. In a reversing gearing, a driving-shaft, a driven-shaft, gearing adapted to operably connect said shafts for reverse drive, clutch-mechanism adapted to connect said shafts for forward drive through the reverse drive gearing, said clutch-mechanism having means which admits of its operative disconnection from the driven shaft of the reverse drive gearing in reverse drive.

6. In a reversing gearing, a driving shaft, a driven shaft, gearing adapted to connect said shafts to secure reverse drive, mechanism adapted to connect said shafts to secure forward drive, said mechanism having means for engaging a component of the reverse drive gearing when operated for forward drive and for entirely disengaging the same when the parts are in neutral and reverse drive positions.

7. In a reversing gearing, a driving shaft, a driven shaft, gearing adapted to operably connect said shafts for reverse drive, clutch-mechanism adapted to operably connect said shafts for forward drive including a clutch controller, said controller when in neutral position being adapted to disconnect the clutch-mechanism from a driven element and permit operation of the reverse drive gearing independently thereof, and means to move said controller from neutral to forward drive position to connect the clutch mechanism and shafts together and also operate the clutch.

8. In a reversing gearing, a driving shaft, a driven shaft, gearing adapted to operably connect said shafts for reverse drive, clutch-mechanism adapted to operably connect said shafts for forward drive including a clutch controller, and means to move said controller into interlocking engagement with a driven component of the reverse drive gearing for forward drive, and to disengage the same when in neutral and reverse drive positions.

9. In a reversing gearing, a driving shaft, a driven shaft, gearing adapted to operably connect said shafts for reverse drive, clutch-mechanism adapted to operably connect said shafts for forward drive including a clutch controller, and means to move said controller into interlocking engagement with a driven component of the reverse drive gearing for forward drive and to operate the clutch, and to disengage the same when in neutral and reverse drive positions.

10. In a reversing gearing, a driving shaft, a driven shaft, gearing adapted to connect said shafts for reverse drive, clutch-mechanism adapted to connect said shafts for forward drive, including a clutch-controller for actuating the clutch, said controller also being movable into engagement with a component of the reverse drive gearing to set the clutch in forward drive position and movable out of engagement therewith to disconnect it therefrom and permit it to remain stationary in all other positions of the parts, and means for moving said controller.

11. In a reversing gearing, a driving shaft, a driven shaft, gearing adapted to connect said shafts for reverse drive, clutch-mechanism adapted to connect said shafts for forward drive, including a clutch-controller for actuating the clutch, said controller being also movable into sliding engagement with a component of the reverse drive gearing, and movable out of engagement therewith to disconnect it therefrom and permit it to remain stationary in all other positions of the parts and means for moving said controller.

12. In a reversing gearing, a driving shaft, a driven shaft, gearing adapted to connect said shafts for reverse drive, clutch-mechanism adapted to connect said shafts for forward drive, and including a clutch-controller for actuating the clutch, said controller also being movable into engagement with a driven element to set the clutch in forward drive position, and movable out of engagement therewith to disconnect it therefrom and permit it to remain stationary in all other positions of the parts, and means for moving said controller.

13. In a reversing gearing, a driving shaft, a driven shaft, gearing adapted to connect said shafts for reverse drive, clutch-mechanism adapted to connect said shafts for forward drive, said clutch-mechanism including a clutch-controller for actuating the clutch, said controller being movable axially into and out of engagement with a driven element, in one position to put the clutch in forward drive position and in the other position to disconnect it therefrom and permit it to remain stationary in all other positions of the parts, and means for moving said controller.

14. In a reversing gearing, a driving shaft, a driven shaft, gearing adapted to operably connect said shafts for reverse drive, clutch-mechanism adapted to operably connect said shafts for forward drive including a clutch-controller, said controller when in neutral position being adapted to disconnect the clutch-mechanism from a driven element and permit operation of the reverse drive gearing independently thereof, and means to move said controller from neutral to forward drive position to connect the clutch mechanism and shafts together and also operate the clutch, and to move said controller from forward drive position to neutral to disconnect the clutch-mechanism from the driven element and to disengage the clutch and to lock said controller in neutral position during reverse drive operation.

15. In a reversing gearing, a driving shaft, a driven shaft, gearing adapted to operably connect said shafts for reverse drive, clutch-mechanism adapted to operably connect said shafts for forward drive including a clutch-controller, and means to move said controller into interlocking engagement with a driven component of the reverse drive gearing for forward drive, and to disengage the same when in neutral and reverse drive positions, and also disconnect it from the clutch and lock it in neutral position.

16. In a reversing gearing, a driving shaft, a driven shaft, gearing adapted to connect said shafts for reverse drive including an internal gear, clutch mechanism, including an actuating member, said member being movable to operate the clutch and also into and out of engagement with the internal gear of the reverse drive gearing.

17. In a reversing gearing, a driving shaft, a driven shaft, gearing adapted to connect said shafts for reverse drive, clutch-mechanism adapted to connect said shafts for forward drive comprising a clutch plate carrier adapted to be connected with a component part of said gearing for direct drive and disconnected therefrom for neutral, and actuating mechanism for said carrier for moving it to actuate the clutch.

18. In a reversing gearing, a driving shaft, a driven shaft, gearing adapted to connect the shafts for reverse drive, clutch-mechanism adapted to connect said shafts for forward drive comprising a clutch plate carrier adapted to be slidably connected with and disconnected from a component part of said gearing and actuating mechanism for said carrier for moving it to actuate the clutch.

19. In a reversing-gearing, a driving shaft, a driven shaft, gearing connecting the shafts and including an internal gear fixed to the driven-shaft, a brake-mechanism to secure reverse drive, and clutch-mechanism to secure forward drive including a clutch-controller and its associated actuating mechanism, with said controller free on the driven-shaft, and having an interlocking connection with the internal gear in forward drive position of the clutch and being free of such internal gear when the parts are in neutral and reverse drive positions.

20. In a reversing-gearing, a driving-shaft, a driven-shaft, gearing adapted to connect the shafts to secure reverse drive, clutch-mechanism adapted to connect said shafts to secure forward drive, the controlling member of the clutch-mechanism serving as a plate-carrier with which some of the clutch plates are associated and adapted to connect its associated clutch-plates with a component part of the gearing when the clutch is set for forward drive, and actuating-mechanism for the controlling-member adapted to free the plate-carrier from the associated part of the reverse drive gearing in the movement of such actuating-mechanism to neutral position from forward drive position.

21. In a reversing-gearing, a driving-shaft, a driven-shaft, gearing adapted to connect the shafts to secure reverse drive, clutch-mechanism adapted to connect the shafts to secure forward drive, the clutch-mechanism including a plate-carrier with which certain plates of the clutch are associated, mounted for free movement on the driven-shaft, and actuating-mechanism for moving said plate-carrier axially of the shafts, in one direction to secure clutching coöperation of the parts, and to interlock the carrier with a component part of the reverse drive gearing to provide a forward drive, and in an opposite direction to free the plate-carrier from such component part of the reverse drive gearing for a neutral position.

22. In a reversing-gearing, a driving-shaft, a driven-shaft, gearing adapted to connect the shafts to secure reverse drive, clutch-mechanism adapted to secure the shafts to secure forward drive, including a plate-carrier and plates which are operatively associated with said carrier and with reverse drive gearing said plate-carrier being free for axial and rotary movement on the driven-shaft, and operable also as a clutch-controlling member to secure clutching coöperation of the plates, and to simultaneously interlock with a component part of the reverse drive gearing secured to the driven-shaft, the movement of the plate-carrier to free the clutching coöperation of the plates disconnecting such carrier from such component part of the reverse drive gearing.

23. In a reversing-gearing, a driving-shaft, a driven-shaft, gearing adapted to connect the shafts to secure reverse drive, a clutch-mechanism adapted to connect the shafts to secure forward drive, the controlling member of the clutch-mechanism being free for axial and rotary movement on the driven-shaft in the unclutched relation of the clutch-plates, and adapted to be interlocked with a component part of the reverse drive gearing which is secured to the driven-shaft, in the clutched positions of said plates.

24. In a reversing-gearing, a driving-shaft, a driven-shaft, gearing adapted to connect the shafts to secure reverse drive, clutch-mechanism adapted to connect the shafts to secure forward drive, said clutch-mechanism comprising a plate-carrier and clutch plates alternately associated with said carrier and with a component part of the reverse drive gearing, said carrier being free for axial and rotary movement on the driven-shaft in the unclutched relation of the plates, and being interlocked with a component part of the reverse drive gearing, secured to the driven-shaft, in the clutched relation of the plates, and actuating-means to move said carrier to clutch and unclutch the plates and to interlock and free it from the component part of the gearing to direct the drag of the plates in unclutched relation to a member idle with respect to the driven-shaft.

25. In a reversing-gearing, a driving-shaft, a driven-shaft, gearing adapted to connect the shafts to secure reverse drive, clutch-mechanism adapted to connect the shafts to secure forward drive, and including a controlling member having certain of the clutch members associated therewith, and being idle with respect to the driven-shaft in the neutral relation of the parts, and actuating-means for causing said member, when moved to clutching position, to interlock with a component part of the reverse drive gearing secured to the driven-shaft.

26. In a reversing-gearing, a driving-shaft, a driven-shaft, gearing adapted to connect the shafts to secure reverse drive, clutch-mechanism adapted to connect the shafts to secure forward drive, and including a member normally idle on the driven-shaft and capable of axial movement thereon under its actuating-means to cause it to serve as a clutch-actuating member and simultaneously interlock with a component part of the reverse drive gearing fixed to the driven-shaft, the said member serving to support certain of the clutch-plates with the remaining plates supported by a component part of the reverse drive gearing.

27. In a reversing-gearing, a driving-shaft, a driven-shaft, gearing adapted to connect the shafts to secure reverse drive, clutch-mechanism adapted to connect the shafts to secure forward drive, comprising clutch-plates, a component part of the reverse drive gearing carrying a part of said plates, and a member idle with respect to said gearing and driven-shaft, carrying another part of said plates, said member being operable to clutch the plates and interlock with a component part of the reverse drive gearing fixed to the driven-shaft, and actuating-mechanism for said member having fixed relation to a component part of the reverse-drive gearing with which the brake-mechanism is associated.

28. In a reversing-gearing, a driving-shaft, a driven-shaft, gearing adapted to connect said shafts to secure reverse drive, clutch-mechanism adapted to connect the shafts to secure forward drive, said clutch-mechanism including clutch-plates carried in part by a component part of said gearing, and carrying another part of said clutch-plates which is idle with respect to the driven-shaft while the clutch-plates are in unclutched relation and interlocked with a component part of the gearing fixed to said shaft when the clutch-plates are in clutching relation, and actuating-means for the clutch adapted to actuate the carrier as a clutch-actuating member and as a means for freeing the clutch-plates from drag effect of the driven-shaft when in unclutched relation.

29. In a reversing-gearing, a driving-shaft, a driven-shaft, gearing adapted to connect said shafts including a brake-mechanism to secure reverse drive, and clutch-mechanism adapted to connect said shafts to secure forward drive, comprising clutch-plates associated in part with a component part of said gearing held by the brake in reverse drive, and a member carrying another part of said clutch-plates which is adapted to be interlocked with a component part of the gearing secured to the driven-shaft when in forward drive, and idle with respect to all parts of the gearing when in neutral or reverse drive.

30. In a reversing-gearing, a driving-shaft, a driven-shaft, gearing adapted to connect said shafts including a brake-mechanism to secure reverse drive, and clutching-mechanism to secure forward drive, and including a clutch plate-carrier with its actuating means for operating said carrier to set the clutch or to release the clutch, and simultaneously interlock said carrier with that component part of the reverse-drive gearing secured to the driven-shaft or free said carrier from connection with any part of said gearing to direct the drag of the plates when in unclutched position to an idle member.

31. In a reversing-gearing, a driving-shaft, a driven-shaft, gearing adapted to connect said shafts, and including brake-mechanism to secure reverse drive, clutch-mechanism to secure forward drive, comprising clutch-plates, a member carrying a part of said clutch-plates and normally idle with respect to the driven-shaft, and another part of said clutch-plates being carried by a component part of the gearing, actuating-mechanism movable from neutral in one direction to set the clutch, and in the opposite direction to set the brake, a movement of said actuating-mechanism from neutral to forward drive position and return operating the idle member and being without effect on said member in the movements from neutral to reverse drive position and return, to direct the drag of the clutch-plates when in unclutched position to an idle member in neutral and reverse drive positions of the mechanism.

32. In a reversing-gearing, a driving-shaft, a driven-shaft, gearing adapted to connect said shafts, including brake-mechanism to secure reverse drive, clutch-mechanism to secure forward drive comprising an actuating-member, driving means for it, actuating-means for said actuating-member to move said member to secure forward drive, and adapted to be moved to free the clutch and disconnect the actuating-member from said driving-means for neutral, the actuating-means in part being further operable to set the brake without moving the clutch-actuating member.

33. In a reversing-gearing, a driving-shaft, a driven-shaft, gearing adapted to connect said shafts including brake-mechanism to secure reverse drive, clutch-mechanism to secure forward drive comprising a clutch plate-carrier idle with respect to the driven-shaft in unclutched position, and interlocked with a component part of the gearing fixed to the driven-shaft in clutched position, and actuating-means for said carrier including a sleeve an operating member therefor connected with the brake-mechanism, and connections intermediate the operating-member and sleeve to lock the parts together in movement of such actuating-means from neutral to forward drive position and return, and to free said parts for independent movement of the operating-member in movement of the actuating-means from neutral to reverse-drive position and return.

34. In a reversing-gearing, a driving-shaft, a driven-shaft, gearing adapted to connect said shafts including brake-mechanism to secure reverse drive, clutch-mechanism to secure forward drive including a clutch plate-carrier idle with respect to the driven-shaft in unclutched position, and interlocked with a component part of the gearing fixed to the driven-shaft in clutched position, and actuating-means for said carrier including a sleeve, an operating-member therefor connected with the brake-mechanism, and connections intermediate the operating-member and sleeve to lock the parts together in movement of such actuating-means from neutral to forward drive position and return, and to free said parts for independent movement of the operating-member in movement of the actuating-means from neutral to reverse-drive position and return, said connections including a trip interlocking the actuating-means and operating member therefor in neutral position and to and from forward-drive position and freeing the parts in movement from neutral position to reverse-drive position and return.

35. In a reversing-gearing, a driving-shaft, a driven-shaft, gearing adapted to connect said shafts including brake-mechanism to secure reverse drive, clutch-mechanism including clutch plates to secure forward drive comprising a carrier with which certain of the plates are associated, and which is idle with respect to the driven-shaft when the plates are in unclutched relation and fixed with relation thereto through interlocking with a component part of the gearing secured to the driven-shaft when the plates are in clutched relation, actuating-means for said carrier including a sleeve axially movable on the driven-shaft to operate the carrier to unclutched position, and lever-mechanism carried by the sleeve and operable in the movement of the sleeve from neutral to forward-drive position to move the carrier to clutched relation, operating-means for said sleeve connected with the brake-mechanism and including a trip forming a connection between relatively movable parts of said operating-means and held to lock said parts in fixed relation in the movement of the operating-means from neutral to forward-drive position and return, and to free such parts for independent movement of the brake-mechanism connections in the movement of such parts from neutral to reverse-drive position and return.

36. In a reversing-gearing, a driving-shaft, a driven-shaft, gearing adapted to connect the shafts including brake-mechanism to secure reverse drive, clutch-mechanism to secure forward drive comprising clutch-plates carried in part by a component part of the reverse-drive gearing, and a member carrying another part of said plates which is idle with respect to said gearing and driven-shaft and actuating-mechanism adapted to interlock said member with a component part of the gearing fixed to the driven-shaft and thereafter clutch the plates, the actuating-mechanism having fixed relation to a component part of the gearing with which the brake-mechanism is associated.

37. In a reversing gearing, a driving shaft, a driven-shaft, gearing adapted to connect said shafts for reverse drive, clutch-mechanism adapted to connect said shafts for forward drive, actuating-mechanism for said clutch-mechanism, movable in one direction from neutral for forward drive, and being immovable in the other direction from neutral, thereby remaining stationary during reverse drive operation, and operating-mechanism for said actuating-mechanism and said reverse drive gearing.

38. In a reversing gearing, a driving-shaft, a driven-shaft, gearing adapted to connect said shafts for reverse drive, clutch-mechanism adapted to connect said shafts for forward drive, having an actuating-member, actuating-mechanism for said member, movable in one direction from neutral for forward drive and being immovable in the other direction from neutral, thereby remaining stationary during reverse drive operation, and operating-mechanism for said actuating-mechanism and said reverse drive gearing.

39. In a reversing gearing, a driving-shaft, a driven-shaft, gearing adapted to connect said shafts for reverse drive, clutch-mechanism adapted to connect said shafts for forward drive, having a controlling-member adapted to operate it and also connect it with a driven member, actuating-mechanism for said controlling member movable in one direction from neutral for forward drive, and being immovable in the other direction from neutral, thereby remaining stationary during reverse drive operation, and operating-mechanism for said actuating-mechanism and said reverse drive gearing.

40. In a reversing gearing, a driving-shaft, a driven-shaft, gearing adapted to connect said shafts for reverse drive, having an actuating-member, actuating-mechanism for said member having a sliding sleeve movable in one direction from neutral for forward drive and being immovable in the other direction from neutral, thereby remaining stationary during reverse drive operation, and operating-mechanism for said actuating-mechanism connected with said sleeve and said reverse drive gearing.

41. In a reversing gearing, a driving-shaft, a driven-shaft, gearing adapted to connect said shafts for reverse drive, clutch-mechanism adapted to connect said shafts for forward drive, having a controlling member adapted to actuate it and also to connect it with a driven member, actuating-mechanism for said controlling-member including a sliding sleeve movable in one direction from neutral for forward drive, said sleeve being immovable in the other direction from neutral upon engaging said member, thereby remaining stationary in neutral position during reverse drive operation, and operating-mechanism connected with said actuating-mechanism and said reverse drive gearing.

42. In a reversing gearing, a driving-shaft, a driven-shaft, gearing adapted to connect said shafts for reverse drive, clutch-mechanism adapted to connect said shafts for forward drive, actuating-mechanism for said clutch-mechanism for moving it back and forth between neutral and forward drive positions and for holding it in neutral position against movement in the other direction and operating-mechanism for said actuating-mechanism which is connected with the reverse drive gearing and adapted to operate the same independently of the actuating-mechanism.

43. In a reversing gearing, a driving-shaft, a driven-shaft, gearing adapted to connect said shafts for reverse drive, clutch-mechanism adapted to connect said shafts for forward drive, actuating-mechanism for said clutch-mechanism, operating-mechanism connected with the reverse drive gearing and adapted to be connected with and disconnected from said actuating-mechanism.

44. In a reversing gearing, a driving-shaft, a driven-shaft, gearing adapted to connect said shafts for reverse drive, clutch-mechanism adapted to connect said shafts for forward drive, actuating-mechanism for said clutch-mechanism, movable in one direction from neutral for forward drive, and being immovable in the other direction from neutral, thereby remaining stationary during reverse drive operation, and operating-mechanism connected with the reverse drive gearing and adapted to be automatically connected with and disconnected from said actuating-mechanism in predetermined positions thereof.

45. In a reversing gearing, a driving-shaft, a driven-shaft, gearing adapted to connect said shafts for reverse drive, clutch-mechanism adapted to connect said shafts for forward drive, having an actuating-member, actuating-mechanism for said member, movable in one direction from neutral for forward drive and being immovable in the other direction from neutral, thereby remaining stationary during reverse drive operation, and operating mechanism connected with the reverse drive gearing and adapted to be automatically connected with and disconnected from said actuating-mechanism in predetermined positions thereof.

46. In a reversing gearing, a driving-shaft, a driven-shaft, gearing adapted to connect said shafts for reverse drive, clutch-mechanism adapted to connect said shafts for forward drive, having a controlling-member adapted to operate it and also connect it with a driven-member, actuating-mechanism for said controlling-member movable in one direction from neutral for forward drive, and being immovable in the other direction from neutral, thereby remaining stationary during reverse drive operation, and operating-mechanism connected with the reverse drive gearing and adapted to be automatically connected with and disconnected from said actuating-mechanism in predetermined positions thereof.

47. In a reversing gearing, a driving-shaft, a driven-shaft, gearing adapted to connect said shafts for reverse drive, clutch mechanism, actuating-mechanism for said clutch mechanism having a sliding sleeve movable in one direction from neutral for forward drive and being immovable in the other direction from neutral, thereby remaining stationary during reverse drive operation, and operating-mechanism connected with the reverse drive gearing and adapted to be automatically connected with and disconnected from said actuating-mechanism in predetermined positions thereof.

48. In a reversing gearing, a driving-shaft, a driven-shaft, gearing adapted to connect said shafts for reverse drive, clutch-mechanism adapted to connect said shafts for forward drive, having a controlling-member adapted to actuate it and also to connect it with a driven-member, actuating-mechanism for said controlling-member including a sliding sleeve movable in one direction from neutral for forward drive, said sleeve being immovable in the other direction from neutral upon engaging said member, thereby remaining stationary in neutral position during reverse drive operation, and operating-mechanism connected with the reverse drive gearing and adapted to be automatically connected with and disconnected from said actuating-mechanism in predetermined positions thereof.

49. In a reversing gearing, a driving-shaft, a driven-shaft, gearing adapted to connect said shafts for reverse drive, clutch-mechanism adapted to connect said shafts for forward drive, said clutch-mechanism adapted to be disengaged from the driven element in reverse drive position, whereby it will remain stationary, and actuating-means connected with the reverse drive gearing and adapted to be automatically connected with and disconnected from the clutch-mechanism in a predetermined position thereof.

50. In a reversing gearing, a driving-shaft, a driven-shaft, gearing adapted to connect said shafts for reverse drive, clutch-mechanism adapted to connect said shafts for forward drive, said clutch-mechanism adapted to be disengaged from the driven element in neutral position and actuating-means connected with the reverse drive gearing and adapted to be automatically connected with and disconnected from the clutch-mechanism in neutral position.

51. In a reversing gearing, a driving-shaft, a driven-shaft, gearing adapted to connect said shafts for reverse drive, one of the components of which is extended to form a chamber, a clutch for connecting said shafts for forward drive arranged in said chamber, and having an axially movable actuating-member, independent of the reverse drive gearing, adapted to form one wall of the chamber, and means to move said actuating member axially into and out of engagement with the reverse drive gearing, and also to operate the clutch, said means including a shifting lever which is also arranged to operate the reverse drive gearing.

52. In a reversing gearing, a driving-shaft, a driven-shaft, gearing adapted to connect said shafts for reverse drive including a pinion carrier, which is extended to form a chamber, a clutch for connecting said shafts for forward drive, arranged in said chamber having an axially movable actuating-member, made independent of the reverse drive gearing, and arranged to form one wall of the chamber, and means to move said actuating member axially into and out of engagement with the internal gear, and also to actuate said clutch, said means including a shifting lever which is arranged to also operate the reverse drive gearing.

53. In a reversing gearing, a driving-shaft, a driven-shaft and a planetary gearing train between the same comprising a spur gear, an internal gear, a pinion meshing both with said internal and spur gears; a rotatable member carrying said pinion, means for opposing movement of said rotatable member, a pair of said gearing elements adapted for association with a clutch-mechanism, and a clutch-mechanism having a member connected with one of said elements and another member adapted to be connected with another of said elements in forward drive position and to cause engagement of the clutch-elements, and to be disconnected therefrom in reverse drive position and to cause disengagement of the clutch elements.

54. In a reversing gearing, a driving shaft, a driven-shaft and a planetary gearing train between the same comprising a spur gear, an internal gear, a plurality of pinions meshing with said internal and spur gears, a rotatable member carrying said plurality of pinions, means for opposing movement of said rotatable member, a pair of said gearing elements adapted for association with a clutch-mechanism, and a clutch-mechanism having a member connected with one of said elements and another member adapted to be connected with another of said elements in forward drive position and to cause engagement of the clutch-elements, and to be disconnected therefrom in reverse drive position and to cause disengagement of the clutch-elements.

55. In a reversing gearing, a driving shaft, a driven-shaft and a planetary gearing train between the same comprising a spur gear, an internal gear, a pinion meshing both with said internal and spur gears, a rotatable member carrying said pinion, means for opposing movement of said rotatable member, a pair of said gearing elements adapted for association with a clutch-mechanism, and clutch-mechanism connected with one of said elements and having an actuating-member for connecting it with another one of said elements in forward drive position and also to cause engagement of the clutch elements, and to disconnect it therefrom in reverse drive position and also to cause disengagement of the clutch elements.

56. In a reversing gearing, a driving shaft, a driven-shaft and a planetary gearing train between the same comprising a spur gear, an internal gear, a pinion meshing both with said internal and spur gears, a rotatable member carrying said pinion, means for opposing movement of said rotatable member, a pair of said gearing elements adapted for association with a clutch-mechanism, and clutch-mechanism connected with one of said elements and having an actuating-member for connecting it with another one of said elements in forward drive position and also to cause engagement of the clutch elements, and to disconnect it therefrom in reverse drive position and also to cause disengagement of the clutch elements, said actuating-member being arranged on the driven-shaft, and means to move said member axially to actuate it.

57. In a reversing gearing, a driving-shaft, a driven-shaft and a planetary gearing train between the same comprising a spur gear, an internal gear, a plurality of pinions meshing with said internal and spur gears, a rotatable member carrying said plurality of pinions, means for opposing movement of said rotatable member, a pair of said gearing elements adapted for association with a clutch-mechanism, and clutch-mechanism having one member connected with one of said elements and having a second member, an actuating-member for connecting said second member with another one of said elements in forward drive position and also to cause engagement of the clutch-elements, and to disconnect said second member therefrom in reverse drive position and also to cause disengagement of the clutch-elements, said actuating-member being arranged on the driven-shaft, and means to move said actuating member axially to actuate it.

58. In a reversing gearing, a driving-shaft, a driven-shaft, gearing adapted to connect said shafts for reverse drive, clutch-mechanism comprising clutch plates and two carriers therefor, one connected with a component of the reverse drive gearing and the other movable into and out of connection with the driven element, and also adapted to serve as an actuating-member for the clutch-plates.

59. In a reversing gearing, a driving-shaft, a driven-shaft, gearing adapted to connect said shafts for reverse drive, clutch-mechanism comprising clutch plates and two carriers therefor, one connected with a component of the reverse drive gearing and the other movable into and out of connection with the driven element, one of said carriers adapted to actuate the clutch-plates.

60. In a reversing gearing, a driving shaft, a driven shaft, gearing connecting said shafts for reverse drive, clutch-mechanism connecting said shafts for forward drive comprising a plurality of sets of clutch-plates, a carrier for one set of clutch plates connected with a component of the reverse drive gearing, and a second carrier for a second set of clutch plates arranged to be connected with or disconnected from the driven element, and which also controls the clutching of the plates.

61. In a reversing gearing, a driving shaft, a driven shaft, gearing adapted to connect said shafts for reverse drive, clutch mechanism adapted to connect said shafts for forward drive including two complementary sets of clutch plates, one of said sets arranged to be moved into driving connection with said other set for forward drive, and also arranged to be free from driving engagement with said set and from positive connection with rotative components of the gearing in reverse drive.

62. In a reversing gearing, a driving-shaft, a driven-shaft, gearing adapted to connect said shafts for reverse drive, clutch mechanism arranged between a pair of the components of said reverse drive gearing comprising two clutch-plate carriers, one connected with one of said components and the other movable into and out of engagement with the other component.

63. In a reversing gearing, a driving-shaft, a driven-shaft, gearing adapted to connect said shafts for reverse drive having a pair of components adapted to have a clutch-mechanism arranged between them and connected therewith, one of which components is connected with the driven element, clutch-mechanism arranged between said components comprising two clutch-plate carriers, one connected with one of said components and the other movable into and out of engagement with the other component and also adapted to control the clutching of the clutch-plates.

64. In a reversing gearing, a driving-shaft, a driven-shaft, gearing adapted to connect said shafts for reverse drive, clutch-mechanism comprising two clutching elements adapted to engage each other and to be connected with the driven element for forward drive and to disengage each other and to be disconnected from the driven element for reverse drive, and operating means for said clutching elements.

65. In a reversing gearing, a driving-shaft, a driven-shaft, gearing adapted to connect said shafts for reverse drive, clutch-mechanism comprising two clutching elements adapted to engage each other and to be connected with the driven element for forward drive and to disengage each other and to be disconnected from the driven element for neutral and reverse drive, and operating means for said clutching elements.

66. In a reversing gearing, a driving-shaft, a driven-shaft, gearing adapted to connect said shafts for reverse drive, clutch-mechanism for a pair of the components of the reverse drive gearing, comprising two clutching elements, one connected with one of said components and the other adapted to be connected with the other component when moved into engaging position for forward drive and to be disconnected therefrom when moved into neutral and reverse drive positions, and operating means for said clutching elements.

67. In a reversing gearing, a driving shaft, a driven-shaft, gearing adapted to connect said shafts for reverse drive, clutch-mechanism comprising two clutching elements adapted to engage each other for forward drive and to disengage each other for reverse drive, one of said elements adapted to be connected with one of said shafts on reverse drive, and means to connect the other element with the other shaft for forward drive and to disconnect it therefrom on reverse drive.

68. In a reversing gearing, a driving shaft, a driven shaft, gearing adapted to connect said shafts for reverse drive, clutch-mechanism comprising two clutching elements adapted to engage each other for forward drive and to disengage each other on reverse drive, one of said elements adapted to be connected with one of said shafts on forward drive and means to connect the other element with the other shaft for forward drive and to disconnect it therefrom on reverse drive.

69. In a reversing gearing, a driving shaft, a driven shaft, gearing adapted to connect said shafts for reverse drive, clutch-mechanism comprising two clutching elements adapted to engage each other for forward drive and to disengage each other on reverse drive, one of said elements adapted to be connected with one of said shafts on forward drive and means to connect the other element with the other shaft for forward drive and clutch the elements and to disconnect it therefrom on reverse drive and unclutch the elements.

70. In a reversing gearing, a driving shaft, a driven shaft, gearing adapted to connect said shafts for reverse drive, clutch-mechanism comprising two clutching elements adapted to engage each other for forward drive and to disengage each other on reverse drive, one of said elements adapted to be connected with one of said shafts on forward drive and to be operatively disconnected therefrom in neutral, and means to connect the other element with the other shaft for forward drive and to disconnect it therefrom on reverse drive.

71. In a reversing gearing, a driving shaft, a driven shaft, gearing adapted to connect said shafts for reverse drive, clutch-mechanism comprising two clutching elements adapted to engage each other for forward drive and to disengage each other on reverse drive, one of said elements adapted to be connected with one of said shafts on forward drive and to be operatively disconnected therefrom in neutral, and means to connect the other element with the other shaft for forward drive and clutch the elements and to disconnect it therefrom for reverse drive and unclutch the elements.

72. In a reversing gearing, a driving shaft, a driven shaft, gearing adapted to connect said shafts for reverse drive, clutch-mechanism comprising two clutching elements adapted to engage each other for forward drive and to disengage each other for reverse drive, one of said elements being connected with a component of the reverse drive gearing and means to directly connect the other element with the driven element on forward drive and disconnect it therefrom on reverse drive.

73. In a reversing gearing, a driving-shaft, a driven shaft, gearing adapted to connect said shafts for reverse drive, clutch-mechanism comprising two clutching elements adapted to engage each other for forward drive and to disengage each other for natural and reverse drive, one of said elements being connected with a component of the reverse drive gearing and means to directly connect the other element with the driven element on forward drive and disconnect it therefrom on neutral and reverse drive.

74. In a reversing gearing, a driving-shaft, a driven-shaft, gearing adapted to connect said shafts for reverse drive including a pinion carrier, clutch-mechanism comprising two clutching elements adapted to engage each other for forward drive and to disengage each other for reverse drive, one of said elements being connected with said pinion carrier and means to directly connect the other element with the driven element in forward drive position and disconnect it therefrom in reverse drive position.

75. In a reversing gearing, a driving-shaft, a driven-shaft, gearing adapted to connect said shafts for reverse drive including a pinion carrier, clutch-mechanism comprising two clutching elements adapted to engage each other for forward drive and to disengage each other for neutral and reverse drive, one of said elements being connected with said pinion carrier and means to directly connect the other element with the driven element in forward drive position and disconnect it therefrom in neutral and reverse drive position.

76. In a reversing gearing, a driving-shaft, a driven-shaft, gearing adapted to connect said shafts for reverse drive including a pinion carrier, clutch-mechanism comprising two clutching elements adapted to engage each other for forward drive and to disengage each other for neutral and reverse drive, one of said elements being connected with said pinion carrier and means to connect the other element with the driven element in forward drive and disconnect it therefrom in neutral and reverse drive.

77. In a reversing gearing, a driving-shaft, a driven-shaft, two planetary gearing elements connected respectively with said shafts, pinions engaging said gearing elements, a carrier for said pinions having an end wall and a toothed portion arranged to form a space, and clutch-plates arranged in said space, some of which are slidably connected with said toothed portion, an axially movable carrier to which other clutch-plates are slidably connected and operating mechanism for moving said carrier axially.

In testimony whereof, I have signed my name to this specification, in the presence of two subscribing witnesses.

HENRY A. TUTTLE.

Witnesses:
T. T. GREENWOOD,
H. B. DAVIS.